United States Patent [19]
Fritz et al.

[11] Patent Number: 5,390,584
[45] Date of Patent: Feb. 21, 1995

[54] FOLLOW UP MECHANISM FOR A SWASHPLATE BEARING

[75] Inventors: Wayne E. Fritz, Joliet; Thomas A. Watts, Ottawa, both of Ill.

[73] Assignee: Caterpillar Inc., Peoria, Ill.

[21] Appl. No.: 140,952

[22] Filed: Oct. 25, 1993

[51] Int. Cl.[6] .............................................. F01B 13/04
[52] U.S. Cl. ........................................ 92/12.2; 92/57; 91/505
[58] Field of Search ...................... 92/12.2, 57, 70, 71; 91/505, 506

[56] References Cited

U.S. PATENT DOCUMENTS

| | | |
|---|---|---|
| 4,029,367 | 6/1993 | Schwede et al. ............... 91/505 X |
| 4,627,330 | 12/1986 | Beck, Jr. ........................... 92/12.2 |
| 4,858,480 | 8/1989 | Rohde et al. ................... 91/505 X |
| 4,918,918 | 4/1990 | Miki et al. ...................... 91/505 X |
| 5,024,143 | 6/1991 | Schniederjan ................... 92/71 X |
| 5,076,145 | 12/1991 | Born et al. ....................... 92/12.2 |
| 5,207,144 | 5/1993 | Sporrer et al. ................. 91/505 X |

FOREIGN PATENT DOCUMENTS

| | | | |
|---|---|---|---|
| 2647139 | 4/1978 | Germany ....................... 91/505 |
| 3000921 | 7/1981 | Germany ....................... 91/505 |
| 823626 | 4/1981 | U.S.S.R. ........................ 91/505 |

Primary Examiner—Edward K. Look
Assistant Examiner—John Ryznic
Attorney, Agent, or Firm—John W. Grant

[57] ABSTRACT

A follow up mechanism for maintaining a timed positional relationship between a bearing cage of an arcuate roller bearing assembly and a swashplate supported by the bearing assembly includes a flexural elastic link pivotally connected to the bearing cage and having first and second ends slidably disposed within a first bore in a pump housing and a second bore in the swashplate, respectively. The bores are in axial alignment with each other when the swashplate is in the equivalent of its centered position thereby allowing blind assembly of the follow up mechanism thereby eliminating the need for an access opening in the side of the pump housing and the associated cover, gasket and bolts.

10 Claims, 2 Drawing Sheets

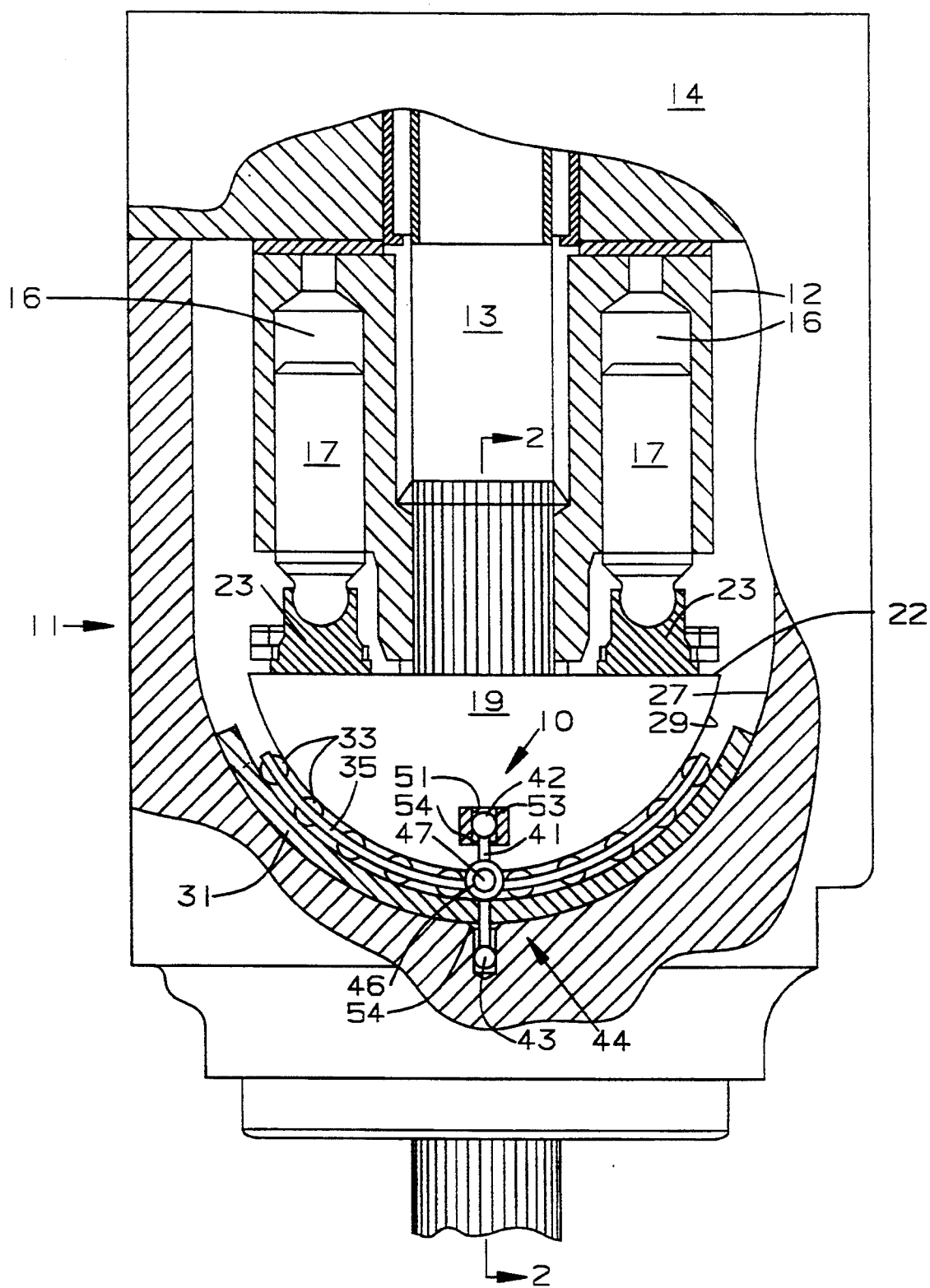
Fig_1

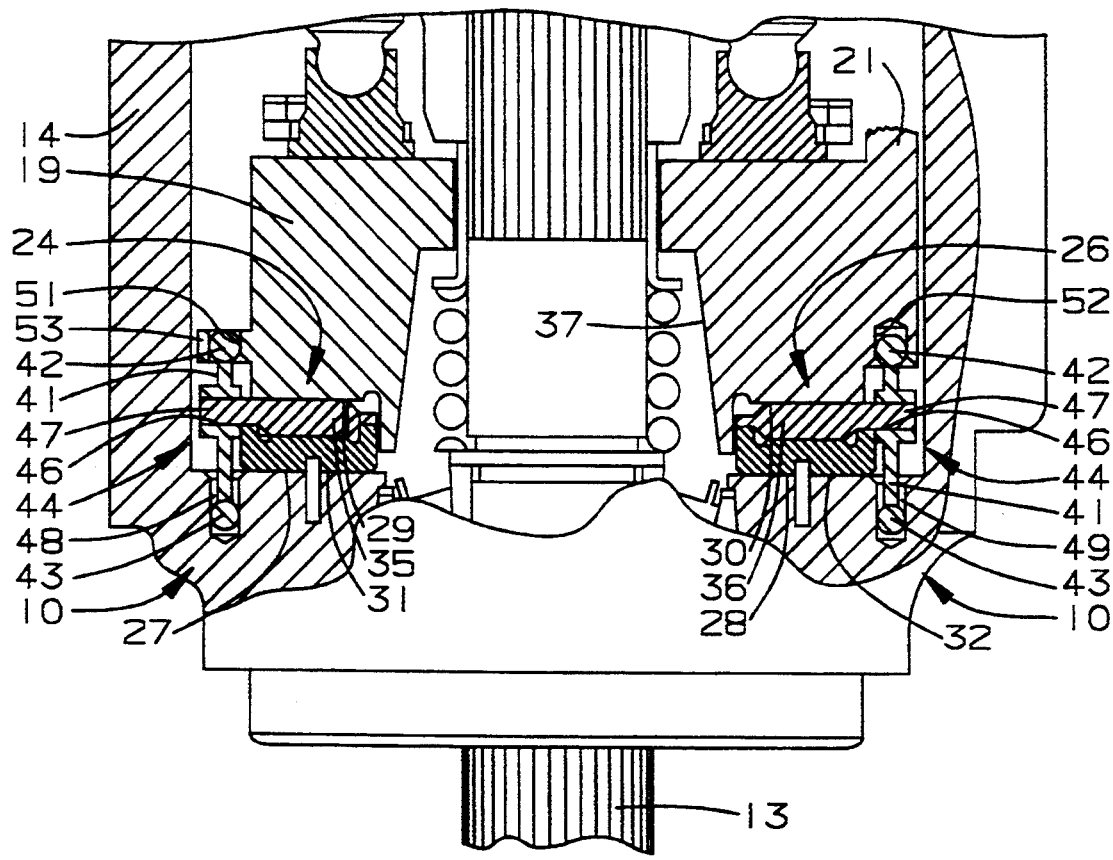
Fig_2_
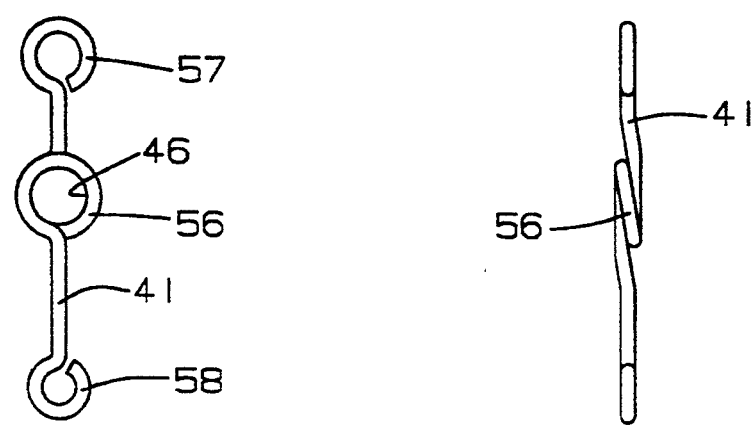
Fig_3_  Fig_4_

FOLLOW UP MECHANISM FOR A SWASHPLATE BEARING

TECHNICAL FIELD

This invention relates generally to a hydraulic axial cylinder device and more particularly to a follow up mechanism for timing the bearing cage of a roller bearing supporting a tiltable swashplate of such devices.

BACKGROUND ART

Axial piston variable displacement hydraulic units utilize a tiltable swashplate to control the displacement of pistons within a rotating cylinder block. One common type of tiltable swashplate is a cradle-type swashplate which is supported at one end of the housing by a pair of arcuate bearings having rolling elements. Each of the pair of roller bearings is provided with a bearing cage locating the individual rollers of the bearing. Roller bearing geometries require the arcuate displacement of the bearing cage be in direct proportion to the arcuate displacement of the cradle swashplate in order to obtain an exclusively rolling motion of the roller elements. Furthermore, since the roller bearings are arcuate but not totally circular, repeated tilting of the swashplate can lead to slipping of the roller elements between the housing and the cradle swashplate to positions other than the desired optimum support positions for resisting the axial thrust of the swashplate.

In order to assure that the arcuate roller bearings do not slip to an adverse position, some of the axial piston hydraulic units have a timing or locating arrangement in the form of elongate rods or links extending between the swashplate and the housing and being connected to the cage of the cradle bearing.

One of the problems encountered with those link-type locating means is that the links either have transversely extending projections extending into mating bores in the swashplate and housing or have openings that slide onto pivot pins extending transversely from the swashplate and the housing. In both cases, the links are installed after the swashplate is installed thereby requiring an access opening provided in the side of the housing. The opening then must be covered by a removable cover with some type of seal or gasket between the housing and the cover. Providing the access opening, the cover and the seal adds to the cost of the unit. Moreover, the access opening provides a potential leakage path from the interior of the unit housing.

In view of the above, it would be desirable to have a simple follow up mechanism in which the timing link can be connected to the bearing cage and preinstalled into the housing and which allows blind assembly into the swashplate. This would eliminate the side access openings in the body and the covers therefor and reduce the number of potential leak paths from the interior of the housing.

The present invention is directed to overcoming one or more of the problems as set forth above.

DISCLOSURE OF THE INVENTION

In one aspect of the present invention, an axial piston hydraulic device has a housing defining at least one concave arcuate surface in the housing, a swashplate positioned in the housing and having at least one arcuate convex surface, and an arcuate roller bearing positioned between the convex and concave surfaces and having an arcuate bearing cage. The device also includes an elongate, flexural elastic timing link having first and second opposite ends, a pivotal connection between the timing link and the bearing cage, a first bore defined in the housing adjacent the concave surface and slidably receiving the first end of the timing link and a second bore defined in the swashplate slidably receiving the second end of the timing link.

BRIEF DESCRIPTION OF THE DRAWINGS

FIG. 1 is a sectional view of a hydraulic unit utilizing the present invention;

FIG. 2 is a partial sectional view taken generally along the lines 2—2 of FIG. 1; and FIGS. 3 and 4 are elevational views of an alternate embodiment of the present invention.

BEST MODE FOR CARRYING OUT THE INVENTION

A follow up mechanism 10 of the present invention is used in an axial piston variable displacement hydraulic unit 11 shown in FIG. 1. The hydraulic unit 11 may be either a pump or a motor and has a rotatable barrel 12 secured to a shaft 13 and which rotates about a central axis. The barrel 12 is disposed within a housing 14 and has a plurality of cylinder bores 16 with a plurality of reciprocating pistons 17 disposed therein. A cradle swashplate 19 is positioned within the housing 14 at one end thereof and is adapted for tilting or pivotal movement induced by an input mechanism represented by a lever 21. The swashplate has a planar cam surface 22 engaged by a plurality of piston slippers 23 so that the tilting movement of the swashplate controls the axial displacement of the pistons 17.

The cradle swashplate 19 is mounted in the housing 14 by a pair of roller bearing assemblies 24,26 positioned between a pair of arcuate concave surfaces 27,28 provided in the housing 14 and a pair of arcuate convex surfaces 29,30 on the swashplate. Each of the roller bearing assemblies include an outer race 31,32 seated in the concave surfaces 27,28, a plurality of rollable elements such as rollers 33 and a bearing cage 35,36 to maintain arcuate spacing between the individual rollers 33. Alternatively, the outer race 31,32 may be omitted from the roller bearing assemblies wherein the rollers 33 directly engage the concave surfaces 27,28 of the housing. The swashplate 19 is provided with a central opening 37 which permits passage of the shaft 13 through the center of the swashplate.

The follow up mechanism 10 includes a pair of flexural elastic timing links 41 having opposite ends 42,43 in the form of spherical balls. Each of the timing links is connected to the associated bearing cage 35,36 through a pivot connection 44. The pivot connection shown in this embodiment includes a pivot hole 46 defined in each of the links 41 and a pin 47 connected to and extending transversely outwardly from the bearing cage into the pivot hole 46. Alternatively, the pivot connection can include a pivot hole in the bearing cage and a pin connected to the link and extending into the pivot hole in the bearing cage. A pair of bores 48,49 are defined in the housing 14 adjacent the concave surfaces 27,28 respectively, and slidably receive the ends 43 of the links 41. A pair of bores 51,52 are defined in the swashplate 19 and slidably receive the ends 42 of the links 41. The bores 48,49 are in axial alignment with the bores 51,52 when the swashplate 19 is in the neutral position shown. The bore 51 is a through bore defined in a tab 53 extending outwardly from the swashplate 19. While the bore 51 is shown as having a constant diameter, alternatively, bore 51 may be a stepped bore having a smaller diameter at the top. Each of the bores have a beveled edge 54.

An alternate embodiment of the link 41 is disclosed in FIG. 3. In this embodiment, the link 41 is in the form of a bent wire with the pivot hole 46 being formed by a 540 degree loop 56 bent into the wire. Each of the first and second ends of the link are defined by a substantially closed loop 57,58, respectively, formed in the wire.

The links 41 may be a composite of material molded into a length of wire, molded from non-metallic material such as various plastics, or pressed from powdered metal.

Alternatively, the pivot connection 44 may include a pin extending transversely into a pivot hole formed in the bearing cage.

Industrial Applicability

In use, the follow up mechanisms 10 are assembled into the hydraulic unit 11 in the following manner. The links 41 are initially connected to the bearing cages 35,36 by sliding the pivot hole 46 onto the pins 47 of the bearing cages 35,36. The assembled links, cages and rollers are then placed on the outer races 31,32 that have been previously positioned and positively located in the housing 14. During this process the ends 43 of the links 41 are guided into the bores 48,49 with the links being supported by the cage once the rollers 33 engages the races 31,32. The friction of the rollers 33 in the bearing cages 35,36 is sufficient to maintain proper position during subsequent assembly of the swashplate 19. The swashplate 19 is then lowered into the housing with the swashplate being maintained at an equivalent to its centered or neutral operating position at which the bores 48 and 51, and 49 and 52 are in substantive axial alignment. During assembly of the swashplate, the beveled edges 54 guide the ends 42 into the bores 51,52. Initial alignment between the bore 51 and the associated pin can be made visually while the alignment between the bore 52 and the end 42 of the associated link is done blind.

During the operation of the completely assembled hydraulic unit, the swashplate 19 is tilted or pivoted on the roller bearing assemblies 24,26 in the usual manner. Pivotal movement of the swashplate causes the bores 51,52 in the swashplate 19 to be angularly displaced relative to the bores 48,49 in the housing 14 such that the ends 42 of the links 41 move angularly relative to the ends 43. The pivotal connection 44, in turn, moves the bearing cages 35,36 the appropriate distance to maintain the proper timing of the bearing cages. During such movement the ends 42 and 43 slide in the associated bores so that the effective length between the ends and the pivot holes of the links remain constant. In this embodiment, the pins 47 extending from the bearing cages are radially offset from the center of the cages and the effective length between the ends 42 and the pivot holes 46 is made slightly larger than the effective length between the ends 43 and the pivot holes 46 to compensate for the offset position of the pivot pins 47.

In view of the above, it is readily apparent that the structure of the present invention provides a follow up mechanism for maintaining a relationship between a bearing cage of a roller bearing assembly and a swashplate supported by the roller bearing assembly that is simple in construction, allows blind assembly into the swashplate during installation of the swashplate into the pump housing, and eliminates the need for side access holes in the housing, the covers therefor and the potential leak paths. The above is accomplished by providing a timing link pivotally connected to the bearing cage and having its opposite ends slidably disposed within a bore in the housing and a bore in the swashplate. The blind assembly is facilitated by the ends on the links being spherical and by having the bores normally in axial alignment during installation of the swashplate.

Other aspects, objects and advantages of this invention can be obtained from a study of the drawings, the disclosure and the appended claims.

We claim:

1. An axial piston variable displacement hydraulic unit having a housing defining at least one concave arcuate surface, a swashplate positioned in the housing and having at least one arcuate convex surface, and an arcuate roller bearing assembly positioned between the convex and concave surfaces and having an arcuate bearing cage comprising;
   a flexural elastic timing link having first and second ends;
   a pivotal connection between the timing link and the bearing cage;
   a first bore defined in the housing adjacent the concave surface and slidably receiving the first end of the link; and
   a second bore defined in the swashplate slidably receiving the second end of the link.

2. The hydraulic unit of claim 1 wherein the first and second bores are in substantial axial alignment in at least one operative position of the swashplate.

3. The hydraulic unit of claim 1 wherein the second bore is a through bore.

4. The hydraulic unit of claim 1 wherein the first and second bores each have at least one beveled edge.

5. The hydraulic unit of claim 1 wherein the pivotal connection includes a pivot hole defined in the link and a pin connected to and extending outwardly from the bearing cage into the pivot hole.

6. The hydraulic unit of claim 5 wherein the first and second ends of the link have a spherical shape.

7. The hydraulic unit of claim 5 wherein the link is in the form of a bent wire with the pivot hole being formed by a 540 degree loop bent into the wire.

8. The hydraulic unit of claim 7 wherein each of the first and second ends of the link is defined by a loop formed in the wire.

9. The hydraulic unit of claim 1 including a tab connected to and extending transversely outwardly from the swashplate, the second bore being defined in the tab.

10. The hydraulic unit of claim 1 wherein the swashplate includes a control lever connected thereto, the second bore being defined in the control lever.

* * * * *